United States Patent [19]

Ohno et al.

[11] Patent Number: 5,219,670
[45] Date of Patent: Jun. 15, 1993

[54] MAGNETIC RECORDING MEDIUM

[75] Inventors: Mikio Ohno; Kiyomi Ejiri; Nobuyoshi Asada, all of Kanagawa, Japan

[73] Assignee: Fuji Photo Film Co., Ltd., Kanagawa, Japan

[21] Appl. No.: 772,747

[22] Filed: Oct. 7, 1991

[30] Foreign Application Priority Data

Oct. 8, 1990 [JP] Japan .................... 2-270158

[51] Int. Cl.⁵ .................... G11B 5/66; B32B 5/16
[52] U.S. Cl. .................... 428/694 B; 428/323; 428/329; 428/330; 428/332; 428/900
[58] Field of Search ............... 428/329, 694, 900, 332, 428/330, 323; 427/131

[56] References Cited

U.S. PATENT DOCUMENTS

| | | | |
|---|---|---|---|
| 4,146,671 | 3/1979 | Fujiyama et al. | 428/329 |
| 4,411,958 | 10/1983 | Sato et al. | 428/694 |
| 4,780,353 | 10/1988 | Takahashi et al. | 428/694 |
| 4,780,366 | 10/1988 | Nishimatsu et al. | 428/694 |
| 4,804,736 | 2/1989 | Utsumi | 428/694 |
| 4,833,019 | 5/1989 | Suwarnasarn | 428/694 |

Primary Examiner—Paul J. Thibodeau
Assistant Examiner—Leszek Kiliman
Attorney, Agent, or Firm—Sughrue, Mion, Zinn, Macpeak & Seas

[57] ABSTRACT

A magnetic recording medium is disclosed, comprising a nonmagnetic support having provided on a first side of the support a magnetic layer containing a ferromagnetic powder and a binder, the ferromagnetic powder is a ferromagnetic metal powder having a water-soluble calcium content of 100 ppm or less, and the ratio of widthwise stiffness (TD) to lengthwise stiffness (MD) of the magnetic recording medium is in the range of from 0.65 to 1.00. In a preferred embodiment, the magnetic layer contains a saturated aliphatic acid having 14 to 24 carbon atoms, the magnetic layer has a dry thickness of from 0.5 to 3.5 μm, the nonmagnetic support has a thickness of from 8 to 11 μm, and the magnetic recording medium further comprises a backing layer having a dry thickness of from 0.1 to 1.0 μm.

8 Claims, No Drawings

MAGNETIC RECORDING MEDIUM

FIELD OF THE INVENTION

The present invention relates to a magnetic recording medium comprising a nonmagnetic support having thereon a magnetic layer. More particularly, the present invention relates to a magnetic recording medium which provides improvements in stiffness, dropout and head staining.

BACKGROUND OF THE INVENTION

A magnetic recording medium has been heretofore formed by dispersing a magnetic powder such as iron oxide, a magnetic alloy or chromium dioxide in a synthetic resin binder and coating the obtained dispersion on a nonmagnetic support such as a plastic film, paper or metal. When a signal is recorded on the magnetic recording medium, or the signal is reproduced from the magnetic recording medium, the magnetic recording medium comes into sliding contact with various magnetic heads and guide poles in the magnetic recording apparatus. As a result, the sliding contact abrades the magnetic layer. Residue from the abraded magnetic layer is dispersed to the surroundings, or becomes attached and accumulates on the guide poles or magnetic heads in the form of a powder. This phenomenon deteriorates the recording and reading of a signal from the magnetic recording medium, and also causes dropout. Thus, abrasion of the magnetic layer deteriorates the function of the magnetic recording medium.

In recent years, as magnetic recording medium have been used in more varied applications, there has been an increased demand for improved magnetic characteristics. For example, it has been desired to shift the recording wavelength to a shorter range, and to eliminate the occurrence of dropout. The present inventors have extensively studied problems associated with the recording of short wavelength signals, particularly dropout and clogging of the head. As a result, it was found that a nearly white powder is produced from abrasion of most magnetic tapes which have been heretofore been used. The powder is generated in large amount under conditions of high humidity. When such a magnetic recording medium was operated in a magnetic recording/reproducing apparatus, a visually perceivable amount of residue deposit, dropout and clogging of the head were observed.

These problems were pronounced when the recording wavelength was short and the head gap was narrow.

The present inventors have extensively studied these phenomenon. As a result, it was discovered that a magnetic recording medium which was prepared by removing calcium from a ferromagnetic powder and then coating the powder on a non-magnetic support with a binder results in little or no deposit of the white powder even under high humidity. It was thus found that the occurrence of dropout and clogging of the head upon recording of short wavelength signals (which generally leads to extensive problems of dropout and clogging), is substantially eliminated.

JP-A-56-101649 (the term "JP-A" as used herein means an "unexamined published Japanese patent application") discloses a magnetic recording medium comprising a magnetic layer comprising a ferromagnetic metal powder and a binder as main components coated on a nonmagnetic support, wherein the amount of components to be eluted in water constituting the ferromagnetic metal powder is in the range of 1,500 ppm or less. In accordance with JP-A-56-101649, the above described magnetic recording medium exhibits excellent magnetic properties, stability and video characteristics. However, it was found that if a calcium ion is present in the ferromagnetic metal powder, dropout, staining and reduced output result at the surface of the magnetic layer, particularly under elevated temperature and high humidity conditions. The present inventors have extensively studied these problems. As a result, the present inventors discovered that an aliphatic acid which had been incorporated into the system as a lubricant reacted with calcium ion to produce the calcium salt of the aliphatic acid, in which the calcium salt caused dropout, staining and reduced output at the surface of the magnetic layer. The present inventors conducted further studies as to how to eliminate calcium salts of an aliphatic acid. As a result, the present inventors discovered that these phenomena are greatly affected not only by the elimination of calcium ion but also by the stiffness of the magnetic recording medium, to thereby arrive at the present invention.

SUMMARY OF THE INVENTION

An object of the present invention is to provide a magnetic recording medium which provides reduced dropout and head staining under conditions of elevated temperature and high humidity.

The above and other objects of the present invention will become more apparent from the following detailed description and examples.

The above object of the present invention is accomplished by providing a magnetic recording medium comprising a nonmagnetic support having provided on a first side of the support a magnetic layer containing a ferromagnetic powder and a binder, the ferromagnetic powder is a ferromagnetic metal powder having a water-soluble calcium content of 100 ppm or less, and the ratio of widthwise stiffness (TD) to lengthwise stiffness (MD) of the magnetic recording medium is in the range of from 0.65 to 1.00.

In a preferred embodiment of the present invention, the magnetic layer contains a saturated aliphatic acid having 14 to 24 carbon atoms (particularly preferably 16 to 22 carbon atoms), the magnetic layer has a dry thickness of from 0.5 to 3.5 $\mu$m (particularly preferably 2.0 to 3.5 $\mu$m), the nonmagnetic support has a thickness of from 8 to 11 $\mu$m (particularly preferably 8.0 to 10.0 $\mu$m), and the magnetic recording medium further comprises a backing layer having a dry thickness of from 0.1 to 1.0 $\mu$m (particularly preferably 0.4 to 1.0 $\mu$m).

In the present invention, examples of the above saturated aliphatic acid include a palmitic acid, a myristic acid, a stearic acid and a behenic acid. Among these, a palmitic acid, a myristic acid and a stearic acid are particularly preferred.

DETAILED DESCRIPTION OF THE INVENTION

In the present invention, the generation of calcium salts of an aliphatic acid is remarkably reduced by adjusting the water-soluble calcium content of the ferromagnetic metal powder to 100 ppm or less (preferably 80 ppm or less and particularly preferably 40 ppm or less). However, this alone is not sufficient. By adjusting the ratio of widthwise stiffness (TD) to lengthwise stiffness (MD) of the magnetic recording medium with the range of from 0.65 to 1.00 (preferably from 0.65 to 0.85), dropout and head staining are considerably reduced. The inventors have studied the reasons for this phenomenon. As a result, it was found that the stiffness ratio of conventional recording media is about 0.52 on the average, about 0.60 at maximum. When magnetic recording media having a relatively small stiffness ratio are stored in the form of a wound tape, many gaps occur between the layers in the wound tape. A wound tape having such gaps is susceptible to the effects of external humidity. For example, in a broadcasting station's tape warehouse, tapes can be stored at a temperature of 30° to 40° C. and a relative humidity of 70% for a prolonged period of time. In Southeast Asia and neighboring areas, storage conditions are much more severe. Under these ambient conditions, an aliphatic acid and calcium ion react over a prolonged period of time to generate calcium salts of the aliphatic acid which results in the above noted dropout, staining and reduction in output. In the present invention, the stiffness ratio of a magnetic recording medium is adjusted to 0.65 to 1.00 such that there are substantially no gaps in layers of the wound tape. As a result, calcium salts of the aliphatic acid are not generated even when stored under elevated temperature and high humidity conditions. Therefore, the present invention provides remarkable improvement in the occurrence of dropout, staining and reduction in output. It was surprising to discover that there is such a close relationship between stiffness and dropout, staining and reduction in output.

For the measurement of water-soluble calcium content, 5 g of a ferromagnetic metal powder are mixed with 10 g of distilled water at room temperature with stirring. The mixture is filtered, and the water-soluble calcium content in the filtrate is then determined by atomic absorption analysis.

The adjustment of the ratio of widthwise stiffness (TD) to lengthwise stiffness (MD) of the magnetic recording medium of from 0.65 to 1.00 can be accomplished by modifying the lengthwise and widthwise Young's modulus of the support. In particular, a support having a lengthwise Young's modulus in tension of from 600 to 1,200 kg/mm$^2$ (particularly preferably from 700 to 1,100 kg/mm$^2$) and a widthwise Young's modulus in tension of from 300 to 900 kg/mm$^2$ (particularly preferably from 300 to 600 kg/mm$^2$) was used. The adjustment method of the stiffness is described in K. Nakamura, *The Technique of Magnetic Head*, pp. 57–69, (1990).

The adjustment of the water-soluble calcium content of the ferromagnetic powder to 100 ppm or less can be accomplished, for example, by forming a gradually oxidized film on the surface of an acicular powder comprising iron as a main component in gas phase.

In the magnetic recording medium, the composition of the finely divided ferromagnetic powder to be incorporated in the magnetic layer is not particularly limited. For example, finely divided powder of known ferromagnetic materials such as metallic or alloy ferromagnetic powders and iron nitride powders as described in JP-B-46-38775, JP-B-47-4286 and U.S. Pat. Nos. 3,242,005 and 3,389,014 can be used. Specific examples of such ferromagnetic powders are described in JP-B-44-14090, 45-18372, 47-22062, 47-22513, 46-28466, 46-38755, 47-4286, 47-12422, 47-17284, 47-18509, 47-18573, 39-10307, 48-29280, 48-39639, 58-29605, and 60-44254 (the term "JP-B" as used herein means an "examined Japanese patent publication"), JP-A-59-126605, and U.S. Pat. Nos. 3,026,215, 3,031,341, 3,100,194, 3,242,005, and 3,389,014.

The grain size of the finely divided ferromagnetic powder is about 0.005 to 1 μm in length. The ratio of axial length (long axis)/axial width (short axis) is in the range of from 1/1 to 50/1. The specific surface area ($S_{BET}$) of the finely divided ferromagnetic powder is 1 m$^2$/g to 70 m$^2$/g. A dispersant, lubricant, antistatic agent or the like as described below may be adsorbed onto the surface of the finely divided ferromagnetic powder prior to dispersion in accordance with the intended purpose by dipping the powder in a solvent containing these agents.

Useful ferromagnetic metal or alloy powders include a metal or metal alloy powder having a metal component content of 75% by weight or more, and at least 80% by weight or more of the metal component is at least one ferromagnetic metal or alloy (e.g., Fe, Co, Ni, Fe-Ni, Co-Ni, Co-Ni-Fe) and further 20 by weight or less of the metal component is other components (e.g., Al, Si, S, Sc, Ti, V, Cr, Mn, Cu, Zn, Y, Mo, Rh, Pb, Ag, Sn, Sb, Te, Ba, Ta, W, Re, Au, Hg, Pb, Bi, La, Ce, Pr, Nd, B, P), or iron nitride powder. In particular, a powder of a ferromagnetic alloy containing iron, cobalt or nickel having a specific surface area of 35 m$^2$/g or more is preferably used. Specific typical examples of such ferromagnetic alloy include a Co-Ni-P alloy, a Co-Ni-Fe-B alloy, a Fe-Ni-Zn alloy, a Ni-Co alloy, and a Co-Ni-Fe alloy.

The above noted ferromagnetic alloy may contain a small amount (i.e., from 0.1 to 2.0 wt % based on the ferromagnetic metal or alloy powders) of water, hydroxide or oxide. The method for preparing such a ferromagnetic metal powder is known in the art. Ferromagnetic alloy powder which is a typical example of a ferromagnetic powder for use in the present invention can be prepared in accordance with known methods.

Examples of preparation methods for preparing the ferromagnetic alloy powder include the following methods:

(a) reduction of a composite organic acid salt (mainly an oxalate) with a reducing gas such as hydrogen;

(b) reduction of iron oxide with a reducing gas such as hydrogen to obtain Fe or Fe-Co particles;

(c) thermal decomposition of a metal carbonyl compound;

(d) addition of a reducing agent such as sodium borohydride, hypophosphite and hydrazine to an aqueous solution of a ferromagnetic metal to reduce the metal;

(e) electrodeposition of a ferromagnetic metal powder on a mercury cathode, and then separating the powder from the mercury; and (f) evaporation of a metal in an inert gas under a reduced pressure to obtain finely divided powder of the metal.

The shape of the ferromagnetic alloy powder for use in the present invention is not particularly limited. Acicular, granular, dice-like, ellipsoidal and plate-like particles may normally be used. The specific surface area ($S_{BET}$) of the ferromagnetic alloy powder is preferably 40 m$^2$/g or more, particularly preferably 45 m$^2$/g or more.

In the present invention, carbon black may be incorporated into the magnetic layer. Examples of carbon black for use in the present invention include furnace black for rubber, thermal black for rubber, black for color, and acetylene black. Specific examples of abbreviations of carbon blacks commercially available in the United States include SAF, ISAF, IISAF, T, HAF, SPF, FF, FEF, HMF, GPF, APF, SRF, MPF, ECF, SCF, CF, FT, MT, HCC, HCF, MCF, LFF, and RCF. In particular, those carbon blacks classified in ASTM D-1765-82a can be used. The carbon black for use in the present invention has an average particle size of 5 to 1,000 mμ (as determined by electron microscopy), a specific surface area ($S_{BET}$) of 1 to 800 m²/g (as determined by a nitrogen adsorption method), a pH value of 7 to 10 (as determined in accordance with JIS K-6221-1982), a dibutyl phthalate (DBP) oil absorption of 5 to 2,000 ml/100 g (as determined in accordance with JIS K-6221-1982), an iodine adsorption of 1 to 1,000 mg/g (as determined in accordance with JIS K-6221-1982), and an As content of 0.2 wt. % or less (as determined in accordance with JIS K-6221-1982). In order to reduce the surface electric resistance of the coating film, carbon black having an average particle size of 5 to 100 mμ is used. In order to control the strength of the coating film, carbon black having an average particle size of 50 to 1,000 mμ is used. For the purpose of controlling the surface roughness of the coating film, finer carbon black particles (100 mμ or less) is used to smoothen the surface of the coating film so that the spacing loss is reduced. For the purpose of roughening the surface of the coating film to reduce the friction coefficient thereof, coarse carbon black having an average particle size of 50 mμ or more is used. Thus, the type and addition amount of carbon black are selected depending on the particular application of the magnetic recording medium.

The carbon black may be surface-treated with a dispersant as described below, or grafted with a resin before use. Carbon black obtained by processing the material at a furnace temperature of 2,000° C. or higher such that the surface thereof is partially graphitized can also be used. In special applications, hollow carbon black can be used.

The carbon black is preferably incorporated in the magnetic layer in an amount of from 0.5 to 10 parts by weight based on 100 parts by weight of ferromagnetic powder.

In regard to carbon blacks for use in the present invention, reference can be made to *Handbook of Carbon Black*, Carbon Black Kyokai, 1971.

In the present invention, the magnetic layer and/or the backing layer may comprise an abrasive. The abrasive for addition to the magnetic layer and/or backing layer of the present invention includes commonly used abrasives or scratching materials. Examples of such abrasives or scratching materials include α-alumina, γ-alumina, α-γ-alumina, molten alumina, silicon carbide, chromium oxide, cerium oxide, corundum, artificial diamond, α-iron oxide, garnet, emery (main component: corundum, magnetite), silica, silicon nitride, boron nitride, molybdenum carbide, boron carbide, tungsten carbide, titanium carbide, tripoli, diatom earth, and dolomite. Abrasives or scratching materials having a Mohs' hardness of 6 or more can be used alone or in a combination of two to four kinds thereof. These abrasives preferably have an average particle size of from 0.005 to 5 μm, particularly from 0.01 to 2 μm. The abrasive is used in an amount of from 0.01 to 20 parts by weight based on 100 parts by weight of binder.

The magnetic layer of the magnetic recording medium of the present invention generally comprises a binder.

The binder contained in the magnetic layer of the present invention includes known thermoplastic resins, thermosetting resins, reactive resins or a mixture thereof.

Useful thermoplastic resins include those having a softening point of 150° C. or less, an average molecular weight of 10,000 to 300,000 and a polymerization degree of about 50 to 2,000. Examples of the thermoplastic resin include a vinyl chloride-vinyl acetate copolymer, a vinyl chloride polymer, a vinyl chloride-vinylidene chloride copolymer, a vinyl chlorideacrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester vinylidene chloride copolymer, a methacrylic acid ester-styrene copolymer, a urethane elastomer, a nylon-silicone resin, a nitrocellulose-polyamide resin, a vinyl polyfluoride, a vinylidene chloride-acrylonitrile copolymer, a butadieneacrylonitrile copolymer, a polyamide resin, polyvinyl butyral, a cellulose derivative (e.g., cellulose acetate butyrate, cellulose diacetate, cellulose triacetate, cellulose propionate, nitrocellulose, ethyl cellulose, methyl cellulose, propyl cellulose, methyl ethyl cellulose, carboxy methyl cellulose, acetyl cellulose), a styrene-butadiene copolymer, a polyester resin, a chlorovinyl ether-acrylic acid ester copolymer, an amino resin, a various synthetic rubber thermoplastic resin, and mixtures thereof.

The thermosetting resin or reactive resin has a molecular weight of 200,000 or less in the form of coating solution. When the thermosetting resin or reactive resin is coated, dried and heated to undergo condensation, addition or like reaction, the molecular weight thereof becomes infinitive. Preferred among these resins are those which do not soften or melt before undergoing thermal decomposition. Specific examples of such resins include a phenolic resin, a phenoxy resin, an epoxy resin, a polyurethane hardening resin, a urea resin, a melamine resin, an alkyd resin, a silicone resin, an acrylic reactive resin, an epoxy-polyamide resin, a nitrocellulose melamine resin, mixture of a high molecular polyester resin and an isocyanate prepolymer, mixture of methacrylate copolymer and diisocyanate prepolymer, mixture of polyester polyol and polyisocyanate, a urea formaldehyde resin, mixture of low molecular weight glycol, high molecular weight diol and triphenylmethane triisocyanate, a polyamine resin, a polyimine resin, and mixtures thereof.

The binders may be used alone or in combination. Other known additives may be incorporated in the resin. The mixing ratio of ferromagnetic powder to binder in the magnetic layer of the present invention is from 100:5 to 100:300 in terms of parts by weight. Examples of other additives which can be added to the magnetic layer include dispersants, lubricants, abrasives, antistatic agents, oxidation inhibitors, and solvents.

The thermoplastic resin, thermosetting resin and reactive resin each generally contains 1 to 6 functional groups other than main functional groups, such as an acidic group (e.g., carboxylic acid, sulfinic acid, sulfonic acid, phosphoric acid, sulfuric acid, sulfuric acid ester, phosphoric acid ester, and alkyl ester groups of these acid groups); an amphoteric group such as amino acid, aminosulfonic acid, sulfuric or phosphoric ester of aminoalcohol, and alkylbetaine; an amino group, an imino group, an imide group, an amide group, a hydroxyl group, an alkoxyl group, a thiol group, a halogen group, a silyl group, and a siloxane group. Each functional group is incorporated into the resin preferably in an amount of from $1 \times 10^{-6}$ to $1 \times 10^{-2}$ equivalent per g of the resin.

In the present invention, the magnetic layer may comprise a polyisocyanate.

Examples of polyisocyanates for use in the present invention include isocyanates such as tolylene diisocyanate, 4,4'-diphenylenemethane diisocyanate, hexamethylene diisocyanate, xylene diisocyanate, naphthylene-1,5-diisocyanate, o-toluidine isocyanate, isophorone diisocyanate and triphenylmethane triisocyanate; products of the reaction of isocyanates and polyalcohols; and dimer to pentadecamer polyisocyanate produced by the condensation of isocyanates. The polyisocyanate preferably has an average molecular weight of from 100 to 20,000. Examples of the trade name of commercially available polyisocyanates include Coronate L, Coronate HL, Coronate 2030, Coronate 2031, Millionate MR, Millionate MTL (manufactured by Nippon Polyurethane Co., Ltd.), Takenate D-102, Takenate D-110N, Takenate D-200, Takenate D-202, Takenate 300S, Takenate 500 (manufactured by Takeda Chemical Industries, Ltd.), Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (manufactured by Sumitomo Bayer). These polyisocyanates can be used alone or in a combination of two or more to take advantage of the difference in hardening reactivity therebetween. The polyisocyanates can be used in combination with compounds containing hydroxyl groups (e.g., butanediol, hexanediol) or amino group (e.g., monomethylamine, dimethylamine, trimethylamine) or metal oxide catalysts for the purpose of accelerating the hardening reaction. The hydroxyl group- or amino group-containing compounds preferably are polyfunctional. The polyisocyanate is preferably used in an amount of from 5 to 40% by weight based on the total weight of binder.

In the present invention, the backing layer can be prepared according to U.S. Pat. No. 4,684,572.

In the present invention, the magnetic layer and/or the backing layer may comprise a lubricant. Examples of the lubricant for addition to the magnetic layer and/or backing layer for use in the present invention include a finely divided powder of an inorganic substance such as molybdenum disulfide, boron nitride, graphite fluoride, calcium carbonate, barium sulfate, silicon oxide, titanium oxide, zinc oxide, tin oxide and tungsten disulfide; a finely divided powder of a resin such as acrylstyrene resin, benzoguanamine resin, melamine resin, polyolefin resin, polyester resin, polyamide resin, polyimide resin, and ethylene polyfluoride resin; and an organic compound such as a silicone oil, an aliphatic acid-modified silicone oil, graphite, a fluorine alcohol, a polyolefin (e.g., polyethylene wax), a polyglycol (e.g., polyethylene oxide wax), a tetrafluoroethylene oxide wax, a polytetrafluoro glycol, a perfluoroaliphatic acid, a perfluoroaliphatic acid ester, a perfluoroalkylsulfuric acid ester, a perfluoroalkylphosphoric acid ester, an alkyl phosphoric acid ester, a polyphenyl ether, an aliphatic ester made of a monobasic aliphatic acid having 10 to 20 carbon atoms and any one or more of a monovalent, divalent, trivalent, tetravalent and hexavalent alcohol having 3 to 12 carbon atoms, and an aliphatic ester made of a monobasic aliphatic acid containing 10 or more carbon atoms and a monovalent to hexavalent alcohol having 11 to 28 carbon atoms minus that of the aliphatic acid. Other examples of organic lubricants for use in the present invention include aliphatic acids and aliphatic amides, and aliphatic alcohols having 8 to 22 carbon atoms. Specific examples of such organic lubricants include butyl acrylate, octyl caprylate, ethyl laurate, butyl laurate, octyl laurate, ethyl myristate, butyl myristate, octyl myristate, ethyl palminate, butyl palminate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl oleate, oleyl alcohol, and lauryl alcohol. The organic lubricants can be used alone or in combination. Known lubricant additives can be added to the lubricant alone or in combination. Examples of lubricant additives include oxidation inhibitors (e.g., alkyl phenol), rust preventives (e.g., naphthenic acid, alkenylsuccinic acid, dilauryl phosphate), oil agents (e.g., rape seed oil, lauryl alcohol), pressure resistance agents (e.g., dibenzyl sulfide, tricresyl phosphate, tributyl phosphite), detergent-dispersants, viscosity index improvers, pour point depressants, and anti-foaming agents. The lubricant may be added to the system in an amount of from 0.05 to 20 parts by weight based on 100 parts by weight of binder in the same layer.

Examples of dispersants for use in the present invention include aliphatic acids ($R_1COOH$ in which $R_1$ is an aliphatic group having 9 to 21 carbon atoms) having 10 to 26 carbon atoms such as caprylic acid, capric acid, lauric acid, myristic acid, palmitic acid, stearic acid, oleic acid, elaidic acid, linoleic acid, linolenic acid and stearolic acid, an amide of the above noted aliphatic acid, and lecithin. Other examples of dispersants for use in the present invention include higher alcohols containing 4 or more carbon atoms (butanol, octyl alcohol, myristyl alcohol, stearyl alcohol), sulfuric and phosphoric esters thereof, and amine compounds thereof. Furthermore, polyalkylene oxides, sulfosuccinic acid, sulfosuccinic ester and the like can be used. These dispersants can generally be used in combination. The amount of the dispersant is in the range of from 0.005 to 20 parts by weight based on 100 parts by weight of binder within the same layer. The dispersant may have been previously attached to the surface of ferromagnetic powder or non-magnetic powder, or may be incorporated in the system during dispersion. Reference as to use of the dispersant may be made to JP-B-39-28369, 44-17945, 44-18221, 49-39402, and 48-15001, and U.S. Pat. Nos. 3,387,993, and 3,470,021.

Examples of antistatic agents for use in the present invention include a powder of an electrically conductive substance such as graphite, tin oxide-antimony oxide, tin oxide, and titanium oxide-tin oxide-antimony oxide; a natural surface active agent such as saponin; a nonionic surface active agent such as an alkylene oxide, glycerin, glycidol, a polyvalent alcohol, a polyvalent alcohol ester and an alkylphenol-ethylene oxide addition product; a cationic surface active agent such as a higher alkylamine, a cyclic amine, a hydantoin derivative, an amide amine, an ester amide, a quaternary ammonium salt, pyridine, heterocyclic ring, phosphonium, and sulfonium; an anionic surface active agent containing an acidic group such as carboxylic acid, sulfonic acid, phosphoric acid, sulfuric acid ester, and phosphoric acid ester; and an amphoteric surface active agent such as an amino acid, an aminosulfonic acid, a sulfuric or phosphoric acid ester of an amino alcohol, and alkyl betaine. The surface active agent can be used alone or in admixture. The surface active agent is contained in the magnetic recording medium in an amount of from 0.01 to 10 parts by weight based on 100 parts by weight of ferromagnetic powder in the same layer. These antistatic agents are often useful for purposes other than their antistatic effect, such as for dispersion, improvement in magnetic properties and smoothness, and as a coating aid.

Organic solvents for use in the dispersion, kneading and coating steps include in any proportion a ketone such as acetone, methyl ethyl ketone, methyl isobutyl ketone, cyclohexanone, isophorone, and tetrahydrofuran; an alcohol such as methanol, ethanol, propanol, butanol, isobutyl alcohol, isopropyl alcohol, and methyl cyclohexanol; an ester such as methyl acetate, ethyl acetate, butyl acetate, isobutyl acetate, isopropyl acetate, ethyl lactate, and glycol monoethyl ether acetate; an ether such as diethyl ether, tetrahydrofuran, glycol dimethyl ether, glycol monoethyl ether, and dioxane; an aromatic hydrocarbon such as benzene, toluene, xylene, cresol, chlorobenzene and styrene; a chlorinated hydrocarbon such as methylene chloride, ethylene chloride, carbon tetrachloride, chloroform, ethylene chlorohydrin, and dichlorobenzene; N,N-dimethylformaldehyde, hexane, or the like.

In the present invention, the water-soluble calcium content of calcium contained in the additives other than the ferromagnetic metal powder is preferably 10 ppm or less and particularly preferably 0 ppm.

The dispersion and kneading method is not particularly limited. The order of addition of the components for each layer is appropriately selected. The preparation of the magnetic coating solution and backing layer coating solution can be accomplished by means of an ordinary kneading machine such as a two-roll mill, a three-roll mill, a ball mill, a pebble mill, a Trommel, a sand grinder, a Szegvari, an attritor, a high speed impeller, a dispersing machine, a high speed stone mill, a high speed impact mill, a disperser, a kneader, a high speed mixer, a ribbon blender, a co-kneader, an intensive mixer, a tumbler, a blender, a disperser, a homogenizer, a single axial screw extruder, a biaxial screw extruder, and an ultrasonic disperser. The kneading and dispersion method is further described in T. C. Patton, *Paint Flow and Pigment Dispersion*, 1964, John Wiley & Sons; Shinichi Tanaka, *Kogyo Zairyo (Industrial Materials)*, vol. 25, No. 37, 1977, and the references cited therein. The kneading and dispersion method is also described in U.S. Pat. Nos. 2,581,414, and 2,855,156. In the present invention, kneading and dispersion can be effected in accordance with any of the methods as described in the above cited references to prepare a magnetic coating solution or backing layer coating solution.

In order to form the magnetic layer, an appropriate combination of the above noted components is dissolved in an organic solvent. The thus-obtained coating solution is then coated onto a support and then dried. Examples of support materials for use in the present invention include polyester such as polyethylene terephthalate and polyethylene naphthalate; polyolefin such as polypropylene; cellulose derivative such as cellulose triacetate and cellulose diacetate; vinyl resin such as polyvinyl chloride; plastic such as polycarbonate, polyamide and polysulfone; metal such as aluminum and copper, and ceramics such as glass. These supports may be subjected to corona discharge treatment, plasma treatment, undercoating treatment, heat treatment, dust removal treatment, metallizing treatment, alkaline treatment or the like before coating. The supports are further described in West German Patent 3,338,854A, JP-A-59-116926, U.S. Pat. No. 4,388,368, and Yukio Mitsuishi, "Seni to Kogyo (Fiber and Industry)", vol. 31, pp. 50–55, 1975.

The coating of the magnetic layer and backing layer on the support can be accomplished by an air doctor coating method, a blade coating method, an air knife coating method, a squeeze coating method, a dip coating method, a reverse roll coating method, a transfer roll coating method, a gravure coating method, a kiss-roll coating method, a cast coating method, a spray coating method, or the like. Other coating methods can also be used. These coating methods are further described in *Coating Engineering*, Asakura Shoten, pp. 253–277, Mar. 20, 1971.

Once the magnetic layer is coated on the support in such a coating process, the ferromagnetic powder in the magnetic layer can be oriented at once in the desired direction while being dried. The magnetic layer thus formed is then dried. During this process, the support is normally conveyed at a rate of 10 to 900 m/min., and the drying temperature is controlled to 20° to 130° C. The coated material can be subjected to surface smoothening or cut into a desired shape to prepare the present magnetic recording medium, as disclosed, for example, in JP-B-40-23625 and 39-28368, and U.S. Pat. No. 3,473,960. The method as disclosed in JP-B-41-13181 is considered a basic and important technique in the art.

For preparation of the ferromagnetic or nonmagnetic powder, binder, and additives (e.g., lubricant, dispersant, antistatic agent, surface treatment agent, abrasive, light shielding agent, oxidation inhibitor, fungicide) for use in the present invention, and for preparation of the magnetic recording medium, reference can be also made to JP-B-56-26890.

The present invention is further described in the following Example, but the present invention should not be construed as being limited thereto.

EXAMPLE 1

100 parts by weight of a ferromagnetic alloy powder (composition: Fe 94%, Zn 4%, Ni 2%; Hc: 1,500 Oe; crystal size: 200 Å) were ground in an open kneader for 10 minutes. The powder was then kneaded with 10 parts by weight of a compound obtained b addition of the sodium salt of hydroxyethyl sulfonate to a 86/9/5 copolymer of vinyl chloride, vinyl acetate and glycidyl methacrylate ($SO_3Na = 6 \times 10^{-5}$ eq/g; epoxy $= 10^{-3}$ eq/g; Mw: 30,000) and 60 parts by weight of methyl ethyl ketone. To the obtained mixture were then added the following materials:

| | |
|---|---|
| SO$_3$Na-containing urethane resin ("UR8200" manufactured by Toyobo Co., Ltd.) | 10 parts by weight (as solid content) |
| Abrasive ("A1203" manufactured by Sumitomo Chemical Co., Ltd.; grain size: 0.3 μm) | 2 parts by weight |
| Carbon black (grain size: 40 nm) | 2 parts by weight |
| Methyl ethyl ketone/toluene (= 1/1 by volume) | 200 parts by weight |

The mixture was then subjected to dispersion by a sand mill for 120 minutes. To the obtained mixture were further added the following materials:

| | |
|---|---|
| Polyisocyanate ("Coronate 3041" manufactured by Nippon Polyurethane Co., Ltd.) | 5 parts by weight (as solid content) |
| Butyl stearate | 2 parts by weight |
| Stearic acid | 1 part by weight |
| Methyl ethyl ketone | 50 parts by weight |

The mixture was then stirred for 20 minutes. The obtained mixture was filtered through a filter having an average pore diameter of 1 μm to prepare a magnetic coating solution. The thus prepared magnetic coating solution was then coated on a 10-μm thick polyethylene naphthalate support by means of a reverse roll to a dried thickness of 2.5 μm. The nonmagnetic support in which the magnetic coating solution was coated was then subjected to magnetic orientation with a 3,000 gauss magnetic while the magnetic coating solution was wet. After drying, the material was then subjected to calendering in an arrangement composed of seven consecutive metal rolls at a rate of 100 m/min., a line pressure of 300 kg/cm and a temperature of 90° C. The obtained tape was finally cut into ¾ inch width.

The thus-obtained magnetic tape samples were evaluated as follows:

Stiffness

The stiffness of the samples was measured by a stiffness meter manufactured by Tinus Olsen Testing Machine Co., Inc. in accordance with ASTM D747-70. The stiffness value was read when a lamination of 6 sheets of specimens with a width of ¾ inch and a length of ½ inch was bent at an angle of 20 degree with the clamp and the loading plate positioned 0.14 inch apart. The measuring atmosphere was 25° C. and 65% RH. The full scale bending momemt was adjusted to 0.005 inch-bond.

Number of Dropouts

The number of dropouts of $15 \times 10^{-6}$ seconds per minute was measured, which were generated after a pass through a video deck VR-10 manufactured by Sony. In the measurement, a dropout counter manufactured by Victor and VH02AZ manufactured by Shibasoku were employed.

Stain on Head

A 90-minute length video tape was allowed to run continuously 200 times. Stain on the video head was visually observed. The evaluation was carried ont by four grades as follows:

E . . . No stain was observed
F . . . Slight stain was observed
P . . . Much stain was observed
PP . . . Much stain was observed and head chip shape was not entirely observed.

The results are set forth in Table 1.

TABLE 1

| Example | Water-soluble Ca content in magnetic metal powder | TD/MD stiffness ratio | 15 μs/min. dropout | Head stain |
|---|---|---|---|---|
| Example 1 | 15 | 0.70 | 5 | E |
| Comparative Example 1 | 190 | 0.70 | 60 | F |
| Comparative Example 2 | 400 | 0.70 | 96 | P |
| Comparative Example 3 | 15 | 0.40 | 65 | F |
| Comparative Example 4 | 190 | 0.40 | 194 | P |
| Comparative Example 5 | 400 | 0.40 | 362 | PP |
| Example 2 | 15 | 0.90 | 7 | E |
| Comparative Example 6 | 190 | 0.90 | 144 | P |
| Comparative Example 7 | 400 | 0.90 | 420 | PP |
| Comparative Example 8 | 15 | 1.20 | 70 | F |

From the results of Table 1, it is clearly seen that the samples of the present invention exhibited little dropout and no head staining. On the other hand, the comparative samples, which exceeded the water-soluble calcium content in the magnetic metal powder or the TD/MD stiffness ratio as defined herein, exhibited increase of dropouts and considerable staining of the head.

In accordance with the present invention, the ferromagnetic metal powder may be used as the ferromagnetic powder, and the water-soluble calcium content and the ratio of widthwise stiffness (TD) to lengthwise stiffness (MD) thereof may be adjusted to 100 ppm or less and 0.65 to 1.00, respectively, such that dropout and head staining are remarkably reduced. In a preferred embodiment, the magnetic layer contains a saturated aliphatic acid having 14 to 24 carbon atoms, and the thickness of the magnetic layer, support and backing layer may be defined to predetermined values such that the dropout and head staining are further reduced. It is considered that an aliphatic acid present in the system produces a salt with calcium ion which results in dropout and head staining.

In accordance with the present invention, formation of a salt of an aliphatic acid with calcium ion is negligible, even in the presence of an aliphatic acid, such that dropout and head staining are nearly eliminated even when the magnetic recording medium is stored under elevated temperature and high humidity conditions.

While the invention has been described in detail and with reference to specific embodiments thereof, it will be apparent to one skilled in the art that various changes and modifications can be made therein without departing from the spirit and scope thereof

What is claimed is:

1. A magnetic recording medium comprising a non-magnetic support having provided on a first side of the support a magnetic layer containing a ferromagnetic powder and a binder, said ferromagnetic powder is a ferromagnetic metal powder having a water-soluble calcium content of 100 ppm or less, and the ratio of widthwise stiffness (TD) to lengthwise stiffness (MD) of the magnetic recording medium is in the range of from 0.65 to 1.00.

2. A magnetic recording medium as in claim 1, further comprising a backing layer provided on the opposite side of the support, the magnetic layer contains a saturated aliphatic acid having 14 to 24 carbon atoms, the magnetic layer has a dry thickness of from 0.5 to 3.5 μm, the nonmagnetic support has a thickness of from 8 to 11 μm, and the backing layer has a dry thickness of from 0.1 to 1.0 μm.

3. A magnetic recording medium as in claim 1, wherein the support has a lengthwise Young's modulus in tension of 600 to 1200 kg/mm² and a widthwise Young's modulus in tension of from 300 to 900 kg/mm².

4. A magnetic recording medium as in claim 1, wherein the ratio of ferromagnetic powder to binder in the magnetic layer is from 100:5 to 100:300 by weight.

5. A magnetic recording medium as in claim 1, wherein the ferromagnetic metal powder has a water-soluble calcium content of 80 ppm or less.

6. A magnetic recording medium as in claim 1, wherein the ferromagnetic metal powder has a water-soluble calcium content of 40 ppm or less.

7. A magnetic recording medium as in claim 1, wherein the ferromagnetic powder has a water-soluble content of 15 ppm or less 8. A magnetic recording medium as in claim 1, wherein the ratio of widthwise stiffness (TD) to lengthwise stiffness (MD) is in the range of from 0.65 to 0.85.

* * * * *